Patented Sept. 6, 1927.

1,641,343

UNITED STATES PATENT OFFICE.

JAMES W. MAYNARD, OF MEMPHIS, TENNESSEE.

TEMPERATURE INDICATOR AND TIME-INDICATING ATTACHMENT THEREFOR.

Application filed January 9, 1926. Serial No. 80,233.

The present invention relates to temperature indicators and more particularly refers to time indicating attachment therefor.

The invention further aims to provide a time indicating attachment for temperature indicators, such as thermometers, which will conveniently indicate the lapse of a predetermined time of heat transference and hence contribute to more accurate determination of temperature conditions than would otherwise be obtained with the attention commonly given to such matters by non-technically trained users.

In the drawings, I have illustrated as one embodiment of my invention, a clinical thermometer having a time indicating attachment in the form of a sand glass, and wherein Fig. 1 is a plan view of one example of such a thermometer and attachment;

Fig. 2 is a fragmental plan view of the thermometer, shown in Fig. 1, showing the sand glass adjusted in an angular position with respect to the thermometer stem;

Fig. 3 is an enlarged fragmental side view of the thermometer, showing the mounting for the sand glass;

Fig. 4 is a perspective view of a modified form of sand glass attachment; and

Fig. 5 is a perspective view of a cap or closure for an attachment of the type shown in Fig. 4.

In the embodiment of my invention illustrated in the drawings, the time indicating attachment 10 is adapted to be securely mounted and fixed in any suitable manner, to the upper end of a thermometer 11, herein illustrated as a clinical thermometer. The time indicating attachment 10 comprises a base 12, preferably cup shaped, which is attached to the thermometer stem, an open frame 13 and an upper handle member 14. A portion of the handle member 14 is externally threaded at 15 or otherwise formed, to engage in the open end of the casing 16 usually provided for thermometers of the type referred to.

The frame 13 is shaped (see Fig. 3) to accommodate a sand glass 17, and is provided with pivot pins 18, one of which is adjustable as at 19, pivotally to support the sand glass so that it may be adjusted to a truly vertical position regardless of the position or inclination of the thermometer and frame 13. The sand glass is preferably formed with a metallic band 20 around its middle portion to receive the pivot pins 18 and 19. After the sand glass 17 is adjusted to vertical position it may be clamped in that position by the tightening of the adjustable pivot pin 19.

In the embodiment of the invention shown in Figs. 4 and 5, the indicating attachment 21 is adapted to be removably attached to the thermometer stem, and is provided with a set screw 22, or other clamping device, by means of which it may be securely but removably clamped to the stem of a thermometer of usual form. When the attachment is removed from the thermometer it may be encased within the casing 23, which is formed with a bayonet slot 24 or other device for locking engagement with the set screw 22 thereby to securely hold the thermometer attachment within the casing.

The sand glass 17 may be of the usual construction and may be of a size and capacity desirable for the particular use of the thermometer. For clinical purposes a one half to five minute glass is desirable. By means of the novel mounting of the sand glass, it may be adjusted to a vertical position regardless of the position of the thermometer, which facilitates the use of the instrument by both sitting and reclining patients. My improved time indicating attachment, although desirable as applied to a clinical thermometer, is advantageous in accurately indicating any temperature wherein the time consumed in taking the temperature effects the reading.

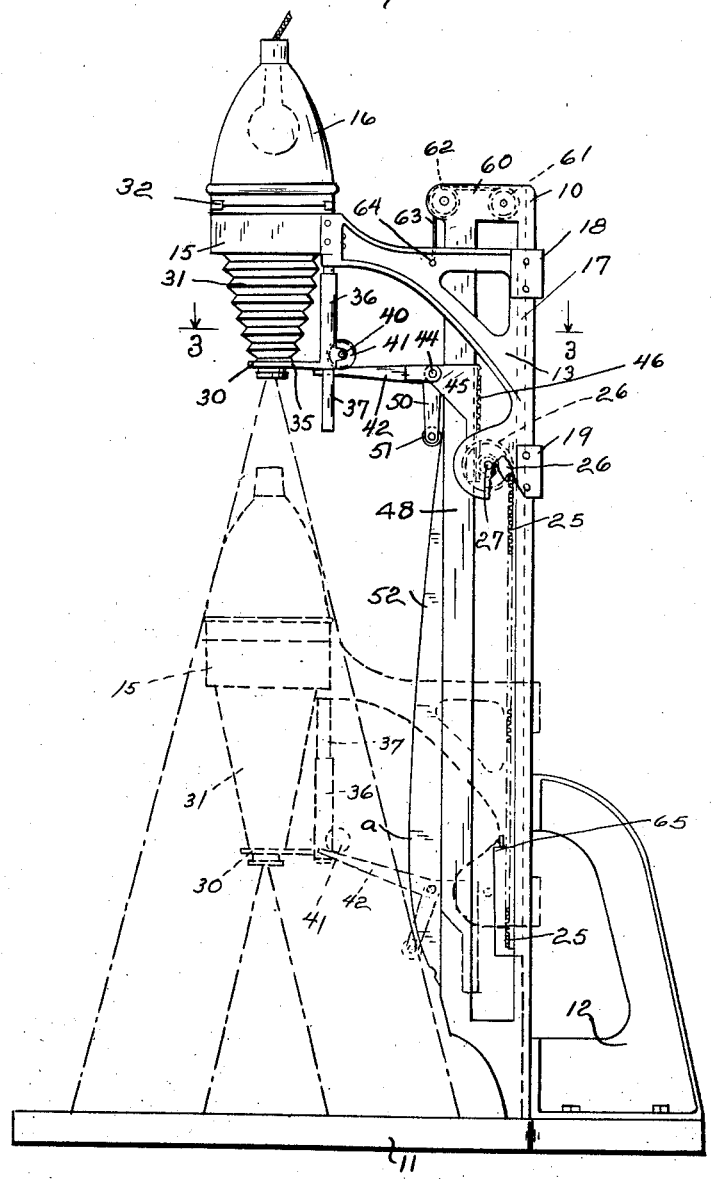

What I claim and desire to secure by Letters Patent is:

1. A time indicating attachment for clinical thermometers comprising a base formed with an open tubular end adapted to be attached to the end of a clinical thermometer, an open frame carried by the base, a sand glass pivotally supported with said frame and adjustable to a vertical position regardless of the position of the thermometer.

2. A time indicating attachment for thermometers comprising a base adapted to be attached to a thermometer, a frame carried by the base, and a sand glass pivotally mounted in said frame.

In testimony whereof, I have signed my name to this specification.

JAS. W. MAYNARD.